May 18, 1937. H. J. MURRAY Re. 20,373
CONE TYPE SYNCHRONIZER FOR AXIALLY MOVABLE CLUTCHES
Original Filed July 12, 1926
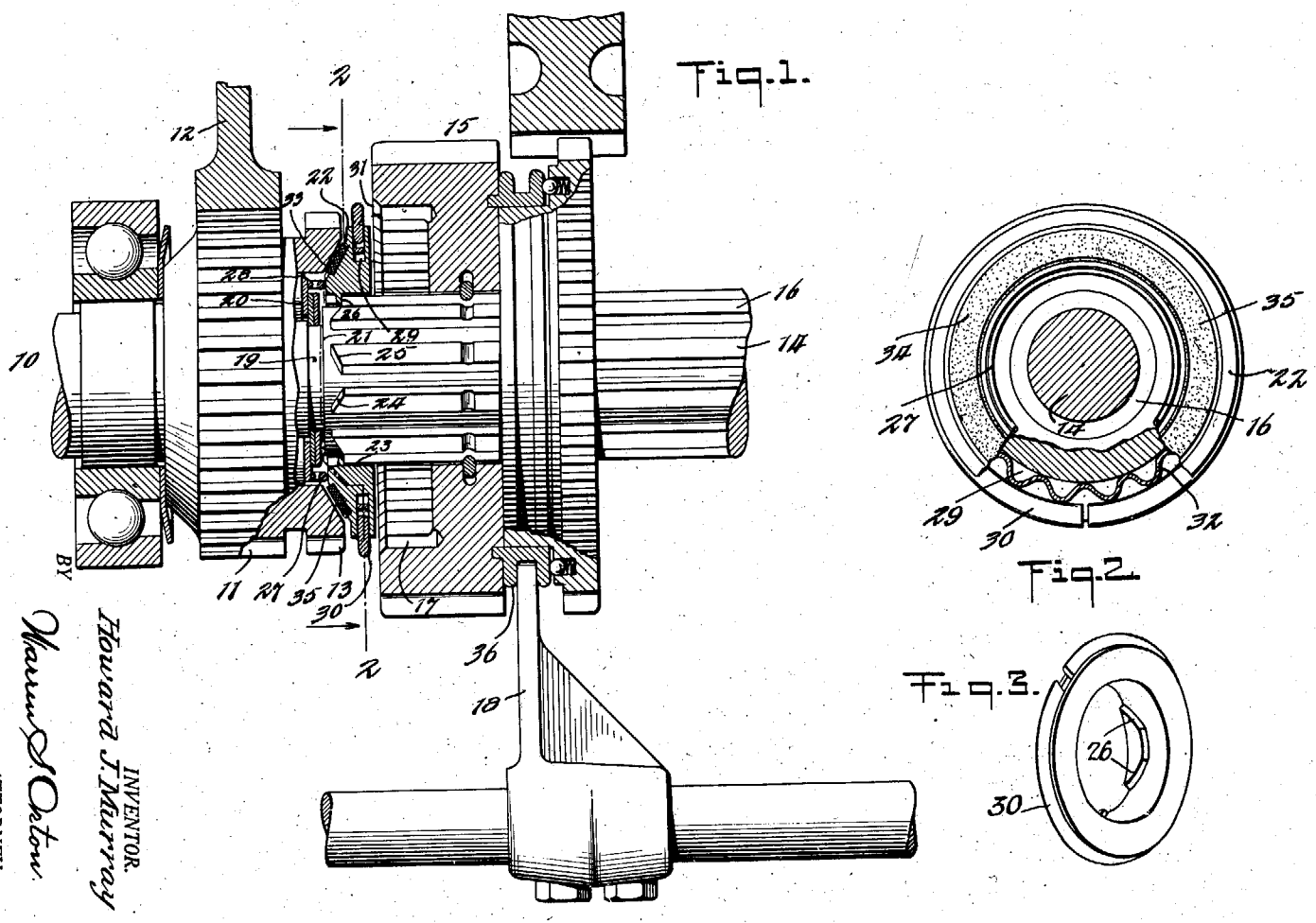
INVENTOR.
Howard J. Murray
BY
Warren S. Orton
ATTORNEY.

Reissued May 18, 1937

Re. 20,373

UNITED STATES PATENT OFFICE 20,373

CONE-TYPE SYNCHRONIZER FOR AXIALLY MOVABLE CLUTCHES

Howard J. Murray, New York, N. Y., assignor, by mesne assignments, to Borg-Warner Corporation, Chicago, Ill., a corporation of Illinois Original No. 1,853,988, dated April 12, 1932, Serial No. 121,886, July 12, 1926. Application for reissue December 8, 1932, Serial No. 646,333

26 Claims. (Cl. 192—53)

The invention relates to a synchronizing device for causing a pair of clutch elements, gears or other power transmitting members to approach the same speed just prior to being moved into meshing or interdriving relation. The invention herein disclosed specifically relates to a synchronizing device for use in those situations where the clutches or gears to be synchronized are moved relative to each other along the same axis of rotation and as an illustration of one situation where a synchronizer of this character is particularly effective the invention will be described in connection with the coupling of the power shaft with the propeller shaft in the transmission casing of an automotive vehicle structure in effecting the usual direct driving relation.

The invention herein disclosed is an improvement in the device disclosed in Patent No. 1,579,728 granted April 6, 1926, and in the device disclosed in application Serial No. 50,279 filed August 14, 1925, and is a companion case with Patent No. 1,822,107 granted September 8, 1931.

In the above Patent No. 1,579,728 there is disclosed in connection with a showing of a conventional form of direct drive gear clutch, a synchronizer in the form of a ring or disk the periphery of which is defined by a split ring so disposed that when the beveled ends of the projections or teeth on the female element of the clutch are brought into bearing engagement with the split ring, it will react on the synchronizer to force the same into clutching engagement with the end of the main or male element of the clutch and in this way provide a frictional drive beween the clutch elements just prior to their interengaging. In the patented showing the clutching faces are disposed in a plane perpendicular to the axis of rotation of the clutch members, and accordingly the clutching engagement is of no greater force than the force which is inherent in the control fork or other power actuated member which moves the female clutch element axially towards the coacting male element.

The primary object of the present improvement is to provide for a more powerful clutching action between the synchronizer and the member with which it frictionally engages than is possible with the showing in the patented form and at the same time to retain the advantages inherent in the structure shown in the patented form.

Broadly, this phase of the invention is attained by the utilizing of a cone form of friction clutch between the synchronizer and one of the clutch elements so that its engagement with its coacting member will be angularly disposed, instead of perpendicularly disposed to the axis of relative movement. In this way it is proposed to resolve the forces which act to shift the synchronizer axially into two components, one of which will provide for a powerfully acting frictional engagement between the synchronizer and its associated element with which it is designed to engage and at the same time to retain a structure which will permit the synchronizer normally to be free to rotate independently of the members to be synchronized until actually moved into operative position.

In the patented showing, the force for effecting the frictional clutching between the synchronizer and the male gear originated in the manually actuated shifting mechanism and of course was no greater than the manual force applied.

The present disclosure features a simplified means for effecting a powerful, mechanically actuated clutching action of the synchronizer with its coacting element independent of the force of the manual control and in this respect the disclosure constitutes another embodiment of the invention described and claimed in pending application Serial No. 614,502 filed January 23, 1923, and Serial No. 50,279 filed August 14, 1925.

Accordingly another object of the invention is to provide means particularly applicable where the clutch elements are in axial alignment for shifting the synchronizer into its clutching relation as an incident to the relative movement between the two elements whose speeds are being synchronized and for providing a form of connection by means of which the power for effecting the clutching action is derived from one of said elements.

Another object of the invention is to provide for the release of the synchronizer from its frictional clutching engagement automatically as the clutch elements are moved into their unclutched or inoperative relation.

Another object of the invention is to provide for the approximate centering of the split ring defining the periphery of the synchronizer in order to prevent accidental displacement of this ring from its associated slot.

Various other objects and advantages of the invention will be in part obvious from an inspection of the accompanying drawing and in part will be more fully set forth in the following particular description of one form of device embodying my invention, and the invention also consists in certain new and novel features of construction and combination of parts hereinafter set forth and claimed.

In the accompanying drawing,

Fig. 1 is a view largely in diagrammatic outline of parts of the conventional form of power transmission for attaining direct or high speed drive, equipped with a synchronizing device constituting a preferred embodiment of the invention;

Fig. 2 is a transverse sectional view through the synchronizer taken on the line 2—2 of Fig. 1 and looking in the direction indicated by the arrows and Figure 3 is a perspective view showing the cams for shifting the synchronizer.

In the following description and in the claims parts will be identified by specific names for convenience of expression but they are intended to be as generic in their application to similar parts as the art will permit and the detailed description follows the description in the above identified patent to show similarity of corresponding parts.

In the drawing there is shown the usual power shaft 10 for driving the main gear 11 and which drives the counter shaft (not shown) through the gear 12. The inner end 13 of the gear 11 also constitutes an axially fixed element of a mechanical clutch and will be referred to hereinafter as the driving or male clutch element or jaw. The propeller shaft 14 which aligns with the power shaft 10 is provided with a gear unit 15 keyed thereto and slidable axially along the splines 16 formed on the shaft 14. The inner periphery of the gear unit 15 is provided with teeth which engage between the splines 16.

The unit 15 includes a coacting clutch element 17 referred to hereinafter as the driven or female clutch element or jaw and into which telescopes the male element 13 as the unit 15 is shifted from right to left of the position shown in Fig. 1 by the controlling mechanism 18. The shaft 14 is provided with a reduced end 19 which extends axially into the gear 11. Antifriction devices 20 are positioned between the reduced end 19 and the inner periphery of the gear 11. The portion of the shaft 14 between the ends of the splines 16 and the reduced end 19 provides a smooth cylindrical bearing 21 at the end of the shaft 14 and between the gear 11 and the unit 15.

A synchronizer 22 is mounted on this smooth bearing portion 21 for both rotary and a slight freedom of axial movement. The synchronizer is in the form of a ring and will sometimes be referred to hereinafter as a clutch ring. The connection with the shaft 14 is conveniently attained by recessing the rear face of the ring to form an annular recess 23 into which extend the adjacent ends of the splines 16. The ends of the splines thus housed are inclined alternately in opposite directions so that adjacent splines have their ends beveled and facing each other to form cam faces 24 and 25 arranged in pairs circumferentially of the shaft. These cam faces are designed, when the synchronizer is in the position shown in Fig. 1, to engage against correspondingly shaped camming faces 26 defining the inner side of the recess 23.

The synchronizer is normally maintained in the position shown in Fig. 1 by means of a coiled seating spring 27 which bears on one side against the forward edge of the synchronizer and on the opposite side bears against the side plate 28 which forms part of the antifriction device 20. The clutch ring is provided with a peripheral groove 29 in which is mounted a split resilient ring 30. This ring is so proportioned that normally when in expanded position it projects radially out of the groove and beyond the peripheral outline of the clutch ring. When so positioned, the split ring is in the path of movement of the teeth forming the female element 17, the free ends of which teeth are shown beveled at 31 as is usual in such constructions. As this ring has a tendency to have its lower side drop out of the groove, it is herein suggested that there be positioned in the groove and within the outline of the spring a split, corrugated centering spring 32.

This present showing particularly distinguishes from the showing in the above identified patent in that the inner end of the main driving gear 11 is beveled to form a frusto-conical bearing face 33 and similarly the coacting face of the synchronizer ring is formed frusto-conical as shown at 34 and these faces are designed to provide a friction clutch of the cone type, in the instant case having an angle of (30) thirty degrees to a plane perpendicular to the axis of the shaft.

Such a construction will give approximately twice the intensity of frictional engagement as compared to the frictional engagement with the flat faced form of friction clutch shown in the above identified patent. It is suggested in this embodiment of the invention that the interclutching surfaces be provided with a friction face herein indicated by a removable inset fabric ring 35 in this instance carried by the synchronizer ring rather than by the clutch element as shown in the patent.

In operation it will be understood that the movement of the control mechanism acting on the gear unit either directly or through the cam ring 36 more particularly identified in Patent No. 1,822,107 will cause the clutch elements provided by the members 13 and 17 to be moved into and from interengaging position. It will be understood that as the gear unit is shifted to the left from the position shown in Fig. 1, it will bring the beveled ends on the teeth of the female element into bearing engagement with the split ring which at this time will function as a resilient stop and transmit the movement of the shiftable unit directly on to the shiftable clutch ring and, even in the absence of the cam shifting organization herein disclosed, will cause the clutch ring to be forced into clutching engagement with the conical end of the main gear. Considering the form of the disclosure which includes the spline cam face construction, the shiftable unit in its tendency to hold the synchronizer ring to its own speed which obviously would be different from the speed of the main drive gear the cam faces are caused to bear on the inclined faces of the synchronizer ring and thus tend to further force the synchronizer ring into its frictional engagement with the main gear. In either case there is thus provided a frictional drive between the gear 11 and the unit 15 and in this way there is effected a direct frictional drive between the shafts 10 and 14. As the unit 15 continues to move to the left it will act on the split ring and contract the same out of the path of movement of the shifting gear unit, and in this way permit the female element to telescope the synchronizing device and to move into direct clutching engagement with the male element as is usual in such constructions. The split ring 30 in its tendency to expand while telescoped by the unit 15 will bear on the teeth of the female clutch member 17 and thus assist in holding the jaws in their interclutching position.

In shifting the control fork 18 to the right in order to effect an unclutching of the elements there will be exerted sufficient force to overcome the locking effect of the split ring in its engagement with the teeth of the female clutch member. As the sliding unit is moved to the right away from the synchronizer the coiled seating spring 27 will react to shift the synchronizer as a whole towards the right and out of its frictional clutching engagement with the main drive gear and into position interlocked with the beveled ends of the splines.

At the end of the final shifting movement the parts will be restored into the position shown in Fig. 1 and the synchronizing parts will be automatically restored into position so as to become effective when the gear unit 15 is again shifted to effect an intermeshing between the members 13 and 17 forming the clutch.

By means of the improvement herein suggested it is possible to synchronize the speed of the clutch elements and cause a subsequent intermeshing without necessity of exerting anything more than a light movement of the controlling mechanism, where such mechanism is manually actuated, and the use of relatively weak machinery where the control mechanism is mechanically actuated. This is particularly true where, as in the illustrated showing, the power inherent in the inertia of the relatively movable clutch members to be synchronized is utilized for the purpose of effecting the synchronization.

Having thus described my invention, I claim:

1. In a transmission, the combination of a driving shaft provided with a main gear one end of which constitutes a clutch element and which end is recessed to provide a clutch face of a friction clutch of the cone type, a driven shaft having a reduced end extending axially into the main gear and provided with a longitudinally extending spline terminating in an inclined end to form a cam and said cam being in spaced relation to the reduced end to provide a cylindrical bearing surface, a gear unit slidable on said spline and provided with a coacting clutch element adapted to be moved in one direction into clutching engagement with the clutch element on the main gear, a synchronizer mounted for rotary movement on said cylindrical bearing surface, provided on one side with a frusto conical face adapted to engage in the recessed end of the main gear to provide the conical friction clutch, and provided on the other side with a plurality of faces inclined to the plane of rotation and adapted to coact with the cam at the end of the spline to effect a frictional engagement with the main gear, resilient means tending to move the synchronizer towards the cam on the spline and a control for shifting the unit into engagement with and past the synchronizer, and into clutching engagement with the main gear, and for causing the unit to shift the synchronizer circumferentially and thus cause the cam on the spline to shift the synchronizer axially and into clutching engagement with the main gear.

2. In a device of the class described, the combination of a shaft, a clutch ring rotatably mounted on the shaft and having a slight freedom of movement into a clutching position, means controlled by relative rotary movement between the shaft and ring for shifting the ring on the shaft, said clutch ring provided on one side with a frusto-conical face constituting a clutching face, a spring stop carried by the ring normally projecting beyond the outlines thereof, means centering said spring stop concentrically of the axis of said shaft, and a member shiftable on the shaft adapted to engage said stop to cause the clutch ring to move into operative clutching position.

3. In a device of the class described, the combination of a pair of clutch elements mounted for relative axial movement to and from a clutching position, an anti-friction mounting for one of the elements, a synchronizer for causing the elements to approach the same speed prior to interengaging, said synchronizer provided with means coacting with one of the elements to provide a friction clutch, and provided with means coacting with the other element to provide a slip clutch, camming means between said last named element and the synchronizer for forcing the synchronizer into its frictional engagement with the coacting element, and a cam reseating spring positioned between and acting to space apart said anti-friction mounting and the synchronizer.

4. In a device of the class described, the combination of a pair of shafts axially aligned and each provided with an element of a mechanical clutch, one of said shafts provided with splines on which one of said elements is slidably mounted, a synchronizer positioned between the elements for causing them to approach a common speed before moving into intermeshed relation, the ends of alternate splines adjacent the other element being inclined in one direction from edge to edge and the ends of the remaining splines being inclined in the opposite direction, said inclines forming straight edged cams inclined to the plane of rotation of the elements and operatively disposed when the element on the splines is shifted axially to shift the synchronizer axially and into a frictional clutching engagement with the other element.

5. In a device of the class described, the combination of a gear, an antifriction mounting for said gear, a shaft extending axially relative to the gear and journalled in said anti-friction mounting, a gear unit slidable on said shaft and adapted to be moved into intermeshed engagement with said gear, a synchronizer between the gear and the gear unit for causing them to approach a common speed, means for moving the synchronizer into a frictional clutching engagement with the gear and a spring positioned between said antifriction mounting and the synchronizer tending to move the synchronizer in a reverse direction axially along the shaft and into unclutched position.

6. In a transmission, the combination of a driving shaft provided with a main gear one end of which constitutes a clutch jaw, a driven shaft extending axially of the main gear, a gear unit slidable on the driven shaft and including a coacting clutch jaw adapted to be moved in one direction into engagement with the main gear jaw, a clutch ring having a beveled end movable into clutching engagement with the adjacent end of the main gear, said clutch ring provided with a peripheral groove, a split ring positioned in said groove and normally projecting therefrom, means for centering the ring in its groove, said ring disposed in the path of movement of the gear unit as it is moved towards the main gear whereby the continued movement of the gear unit towards its clutching engagement with the main gear will shift the clutch ring into bearing engagement with the main gear and thus cause the shafts to approach the same speed prior to their interengaging through the jaws on the gear unit and main gear.

7. In a device of the class described, the combination of two members movable axially into driving relation, a synchronizer when actively disposed between the members tending to cause them to approach the same speed, said synchronizer including a retractile spring stop normally disposed in the path of relative axial movement of the members and adapted to provide a stop-clutch connection and a centering spring for locating said spring stop approximately concentric of the axis of rotation of the power members.

8. In a device of the class described, the combination of a positive clutch including a pair of jaws mounted for relative axial movement to and from an interdriving position, a synchronizer for causing the jaws to approach the same speed prior to interengaging, a split ring constituting a spring catch forming part of the synchronizer for securing the jaws in their interclutching position, and means for centering the split ring.

9. In a power transmission, a composite clutch comprising a jaw clutch element having an annular row of outwardly radially extending gear-like teeth and a friction clutch element having a friction surface, said row of teeth and friction clutch surface disposed with the former encircling the latter, a spline shaft and axially movable jaw clutch element having teeth extending radially inwardly adapted to interlock with the gear-like teeth of its companion, an axially movable friction disc having projections disposed in a trough between a pair of the splines of the shaft and directly driven thereby, said disc provided with a conical friction surface adapted to engage the friction surface of its companion by projection within the confines of the toothed portion of said jaw clutch element, said disk being disposed between the annular row of gear-like teeth and the axially movable jaw clutch element and provided with means adapted to permit passage of the teeth on the axially movable jaw clutch element and said disk having a slight freedom of rotary movement about the shaft to cause a combined rotary as well as an axial engagement of the friction clutch elements at the instant of contact.

10. A power transmission including a spline shaft, a gear rotatable with respect to the shaft and having clutch teeth and a friction clutch surface, a shiftable power transmission element having clutch teeth for connecting the gear to the shaft and having a recess formed therein, a friction device in the form of a disk provided at its inner perimeter with means fitting between the splines of the shaft and with a conical friction face radially spaced from its inner perimeter for coacting with the friction surface on the gear, and to form a spring engaging surface between the inner periphery and the friction face, a spring bearing on said surface, said friction disk disposed between the gear and the shiftable element for synchronizing the speed of said gear and said shiftable element, said friction device provided with a projection adapted to be received in the recess of the shiftable element to permit shifting of the shiftable element past the friction device and into driving engagement with the gear and means for shifting the shiftable gear and for causing the friction device to function.

11. In a device of the class described, the combination of a shaft, a power member mounted for rotary movement about the axis of the shaft, said power member provided with a ring-like extension radially spaced from the shaft to provide an annular clearance between the extension and shaft, one periphery of which extension when in operative position forms an element of a cone type friction clutch and the other periphery of which is provided with teeth forming a clutch member, a synchronizing mechanism for causing the shaft and power member to approach the same speed, said mechanism including a ring-like member carried by the shaft, turning therewith and provided with a surface adapted to coact with the said friction element to form a friction clutch of the cone type, said ring-like member designed to provide a clearance facing the teeth of the power member and a slide member turning with the shaft provided with a shift finger receiving slot and on one side of said slot with teeth forming a clutch member at one end of the slide member, said slide member adapted to be disposed in a neutral position with its clutch member spaced from and thus disconnected from the power member and from said ring-like member, and said slide member adapted to be moved from said neutral position towards the power member to cause the clutch member on the advancing end to pass across said clearance and thus by-pass the ring-like member and to engage the teeth on the power member and means operable in one direction for shifting the slide member and for causing the synchronizing mechanism to become operative.

12. In a device of the class described, the combination of two rotative members adapted to be connected to drive one from the other, one of said members comprising a spline shaft and the other a power gear mounted for rotary movement about the axis of the shaft, said gear provided with teeth forming an element of a positive clutch and provided with a bevel surface constituting an element of a friction cone clutch, synchronizing means for causing the two members to approach the same speed before they are disposed in their interdriving relation through said positive clutch, said means including a synchronizer, and having extensions from its inner perimeter fitting between the splines of the shaft provided with a bevel surface constituting the coacting element of the friction cone clutch, a shift member provided with teeth forming the coacting element of the positive clutch, splined to the shaft to turn therewith and shiftable longitudinally thereon to and from an operative engagement with the synchronizer, the bevel friction cone clutch surface on the synchronizer being radially spaced from the path of movement of the teeth on the shift member and means operable as an incident of the shifting of the shift member towards the synchronizer to cause the friction clutch to frictionally connect the shaft and power gear and the teeth of the shift member adapted to pass the synchronizer to engage the teeth of the power gear to inter-connect the members following the functioning of said synchronizing means.

13. The combination of two coaxial power transmitting members adapted to be positively coupled in driving relation, a friction and toothed positive coupling element fixed to one member, separate friction and positive elements in torque transmitting connection with and axially movable on the other member adapted to be engaged and disengaged with the companion elements on the first mentioned member, said slidably mounted friction element including a conical friction surface and fashioned with all parts thereof offset from the path of movement of the slidable positive element thereby to permit the slidable positive element to by-pass the friction element and engage the teeth of its companion, a spring bearing on the slidably mounted friction element tending to force it away from its companion, a deflectable elastic device arranged to produce frictional contact between said axially movable friction and positive elements during the movement of the positive element toward engagement with its companion so as to effect engagement of the friction elements prior to interlocking of the positive elements, and means yieldably centering said elastic device with respect to the axis of said axially movable friction and positive elements.

14. The combination of two coaxial power transmitting members adapted to be positively coupled in driving relation, a friction and toothed positive coupling element fixed to one member, separate friction and positive elements in torque transmitting connection with and axially movable on the other member adapted to be engaged and disengaged with the companion elements on the first mentioned member, means tending to maintain the friction elements separated from each other, said slidably mounted friction element fashioned with all parts thereof offset from the path of movement of the slidable positive element thereby to permit the slidable positive element to by-pass the friction element and engage the teeth of its companion, the friction face of said slidable element having a portion thereof extending at an angle to a plane perpendicular to the common axis of said members, a deflectable elastic device arranged to produce frictional contact between said axially movable friction and positive elements during the movement of the positive element toward engagement with its companion so as to effect engagement of the friction elements prior to interlocking of the positive elements, said elastic friction element comprising an elastic ring supported on the axially movable friction element radially spaced from said other member and disposed in position to be engaged and deflected by the teeth of the axially movable positive element during their passage across the friction element towards engagement with the teeth of the companion positive element, and means centering said elastic device with respect to the axis of said axially movable friction and positive elements.

15. In a device of the class described, the combination of a shaft, a gear mounted for rotary movement about the axis of the shaft, an anti-friction bearing for mounting the gear on the shaft, said gear provided with a ringlike extension projecting from one side and providing a space between the same and the shaft, said ringlike extension provided with an element of a friction clutch and an element of a positive clutch, a slide member driven from the shaft and provided with the coacting element of the positive clutch, means for synchronizing the gear and shaft, said means including an annular member provided with an outer part lapping the end of the ring-like extension and an inner part projecting into said space and journalled on the shaft, and control means operatively connected to the slide member and synchronizing means to cause engagement of the friction clutch elements thereby to connect the shaft and gear frictionally and then to cause the engagement of the positive clutch elements to connect the shaft and gear positively.

16. In a device of the class described, the combination of a spline shaft, a gear mounted for rotary movement about the axis of the shaft, an anti-friction bearing for mounting the gear on the shaft, said gear provided with a ring-like extension projecting from one side and providing a space between the same and the shaft, said ring-like extension provided with an element of a friction clutch and an element of a positive clutch, a slide member driven from the shaft and provided with the coacting element of the positive clutch, means for synchronizing the gear and shaft, said means including an annular member provided with an outer part lapping the end of the ring-like extension and an inner part projecting into said space and keyed to be driven from the shaft, and control means operatively connected to the slide member and synchronizing means to cause engagement of the friction clutch elements thereby to connect the shaft and gear frictionally and then to cause the engagement of the positive clutch elements to connect the shaft and gear positively, and resilient means acting on the synchronizing means in a tendency to separate the friction elements.

17. In a power transmission mechanism, the combination of a spline shaft, a gear member mounted for rotary movement about the shaft, anti-friction devices between said gear member and shaft and located within the outlines of said gear member, said gear member provided with teeth forming an external tooth gear and provided with a friction surface, a toothed clutch element splined to the shaft and provided with radially extending teeth adapted to engage the teeth of the gear member to form a positive clutch between the shaft and said gear member, a disk-like friction clutch element having its inner perimeter riding on the splines of the shaft and provided with diametrically extending projections engaged by the splines of the shaft whereby the shaft rotates the disk through said projections and said disk provided with a conical friction surface for engaging with the friction surface on the gear member to provide a friction drive between the shaft and gear member.

18. In a device of the class described, the combination of a shaft provided with splines, a power member mounted for rotary movement about the axis of the shaft and provided with an element of a positive clutch and an element of a friction clutch, a slide member keyed to the shaft to turn therewith, and provided with the coacting element of the positive clutch, annular synchronizing means between said power member and said slide member for frictionally connecting the shaft and power member and provided with the coacting element of the friction clutch, means engaging the slide member for actuating the synchronizing means and for moving the positive clutch elements into interengagement, said synchronizer provided with extensions projecting radially from its inner periphery and projecting into the spaces between a pair of the splines of the shaft whereby the rotary movement of the shaft acts to turn the synchronizer therewith and a spring engaging the side of the synchronizer facing the power member and positioned close to the shaft and acting to shift the synchronizer along the shaft and away from the power member.

19. In a device of the class described, the combination of a shaft provided with splines, a power member mounted for rotary movement about the axis of the shaft and provided with an element of a positive clutch and an element of a friction clutch, a slide member keyed to the shaft to turn therewith, and provided with the coacting element of the positive clutch, annular synchronizing means between said power member and said slide member for frictionally connecting the shaft and power member and provided with the coacting element of the friction clutch, means tending normally to maintain the friction clutch in an inoperative, unclutched position, said synchronizer provided with extensions projecting radially from its inner periphery and projecting into the spaces between a pair of the splines of the shaft whereby the rotary movement of the shaft acts to turn the synchronizer therewith, a manually controlled shift rod, means including a cushioning connection between the shift rod and synchronizing means for resiliently causing the friction clutch to be moved into its clutching position and actuated from said shift rod in a timed sequence following the actuation of the friction clutch for causing said positive clutch to function.

20. In a device of the class described, the combination of a shaft, a power member mounted for rotary movement about the axis of the shaft and provided with an element of a positive clutch drive and with an element of a conical friction clutch drive, a coacting element of the positive clutch drive connected to the shaft to turn therewith and movable axially thereof to and from its engagement with its companion, a coacting conical friction clutch element in the form of a light ring having a relatively large internal diameter compared to its external diameter, having rotary and axial movement relative to its companion and camming means located within the outlines of its internal diameter and operatively responsive to relative rotary movement between the coacting friction clutch element and the shaft for causing said axial movement and thus causing the conical clutch to become operative.

21. In a device of the class described, the combination of a power member provided with an element of a positive clutch and an element of a friction clutch, mechanism mounted for rotary movement about the axis of the power member and including a spline shaft a coacting element of the positive clutch and a coacting element of the friction clutch both riding on the splines of the shaft, said coacting elements being independently movable axially into clutching engagement with their companions, camming means with one element thereof formed directly on the shaft and its coacting element formed on the coacting friction element axially offset from the portion thereof which rides on the shaft, said camming means being operatively responsive to the tendency of the coacting friction element to rotate relative to the shaft when in friction engagement with the first named friction clutch element for causing the friction clutch elements to increase their frictional engagement.

22. In a device of the class described the combination of a power member provided with an extension having gear-like teeth constituting an element of a positive clutch and having a beveled surface located radially inwardly of said teeth constituting an axially fixed element of a conical friction clutch, a mounting member turning about the axis of the power member and provided with an element of a cam, a coacting friction clutch element turning with the mounting member and provided with the coacting element of the cam and coacting with the first named cam element to cause the friction clutch to become operative and thus frictionally connect the power and mounting members, said friction clutch element having a portion adapted to engage with said beveled surface and to be received radially inwardly of said gear-like teeth, a slide member directly engaging and turning with the mounting member and provided with the coacting element of the positive clutch adapted to telescope the teeth on said power member extension and means acting on the slide member to bring the friction clutch elements together and then to bring the positive clutch elements into interdriving engagement.

23. In a device of the class described, a shaft, a power transmitting member loose on the shaft, said power transmitting member provided with a ring-like extension on one face thereof having teeth on one periphery and a conoidal friction surface on the other periphery, a jaw clutch member slidably keyed to the shaft and provided with teeth spaced away from said shaft and constructed and arranged to telescope the teeth on said extension and to intermesh therewith, a disk-like member centered on the shaft between the power member and the slidable jaw clutch member, said disk-like member being rotatable with said shaft and movable axially with respect thereto, said disk-like member comprising a hub forming part disposed between the shaft and the teeth of the power member, shaped and disposed in position to permit passage of the teeth of the slidable jaw clutch member and a part provided with a conical friction surface proportioned and arranged to coact with the friction surface on the power transmitting member and to enter within the confines of said ring-like extension when in frictional engagement therewith, means for shifting axially the disk-like member and the slidable jaw clutch member comprising connecting means movable initially in unison with the axial movement of said jaw clutch member while approaching its companion.

24. In a device of the class described, the combination of a shaft provided with splines and with a smooth bearing, a power member loose on said bearing and provided on one side with a ring-like extension having teeth on one periphery and a friction face on its other periphery constituting an element of a conical friction clutch encircled by said teeth and located radially inwardly thereof, synchronizing mechanism for causing the member and shaft to approach the same speed, said mechanism including a ring of greater thickness of material adjacent the shaft than at its outer edge portion, said ring being shiftable axially of the shaft, turning therewith and including an inner perimeter and an outwardly extending part having one face beveled and constituting the coacting element of the friction clutch, said outwardly extending portion adapted to project substantially within the confines of said ring-like extension to engage with said friction face a shift member engaging the splines on the shaft and having a peripheral slot, means acting to cause the synchronizing mechanism to function, and including a shift finger engaging in said slot to move the shift member, said shift member provided on the side of the slot adjacent the ring with teeth adapted to move into mesh with the teeth on the gear to provide a positive drive between the power member and the shaft through said shift member, said ring being spaced from the path of movement of the teeth on the shift member thereby to permit the teeth to pass the synchronizer and camming means acting on the synchronizer ring at its inner periphery for forcing the coacting element of the friction clutch into engagement with the friction face on the extension of the power member.

25. In a multiple speed automobile transmission, the combination of two axially aligned shafts, one constituting the normal driving shaft and the other constituting the normal driven shaft of the transmission, mechanism providing in sequence of operation a conical clutch type of frictional drive and then a positive type of clutch drive between the two shafts, the driving shaft provided at its inner end with an enlarged portion forming a main gear and having a reduced end of the driven shaft contained therein, anti-friction means disposed between said reduced end and the portion of the main gear surrounding the same, the portion of the driven shaft adjacent the reduced end provided with splines, the inner end of said enlarged portion beyond the part forming the main gear forming a ring-like extension, said extension provided with a set of outwardly facing gear-like clutch teeth forming an axially fixed element of the positive clutch drive and said extension also provided with a conical surface forming an axially fixed element of the friction clutch drive, an axially shiftable ring provided with a conical face forming the coacting element of the friction clutch drive, said ring being intergeared with the portion of the driven shaft provided with splines thereby to turn therewith, said ring being partially intruded within the ring-like extension and shiftable axially on the shaft to and from its frictional clutching engagement with its fixed companion on the extension, an axially shiftable ring-like member forming the coacting element of the positive clutch drive, encircling and operatively connected to turn with the driven shaft and adapted to telescope the extension but not the main gear, and provided with a set of inwardly facing gear-like teeth radially spaced from the driven shaft and adapted to mesh with the set of teeth on the extension, resilient means carried by the shiftable friction clutch element normally projecting externally outwardly therefrom and providing a give-away stop between the teeth of the positive shiftable clutch element and the shiftable friction clutch element, manually actuated control means directly engaging said positive slidable clutch element and acting during an initial part of its movement in one direction to move the positive clutch element towards its clutching position to act through the stop and to shift the shiftable friction clutch element into its clutching position until stopped by the fixed friction clutch element, and means operative on the further advance of the shiftable positive clutch element to move the stop inwardly towards the driven shaft and into an inoperative position within the shiftable friction clutch element and thus permit the positive clutch element to move still further and into its telescoping and positive tooth clutch engagement with its companion.

26. In a multiple speed automobile transmission, the combination of two axially aligned shafts, one constituting the normal driving shaft and the other constituting the normal driven shaft of the transmission, mechanism providing in sequence of operation a conical clutch type of frictional drive and then a positive type of clutch drive between the two shafts, the driving shaft provided at its inner end with an enlarged portion forming a main gear and having a reduced end of the driven shaft contained therein, anti-friction means disposed between said reduced end and the portion of the main gear surrounding the same, the portion of the driven shaft adjacent the reduced end provided with splines, the inner end of said enlarged portion beyond the part forming the main gear formed with a ring-like extension, said extension provided with a set of outwardly facing gear-like clutch teeth forming an axially fixed element of the positive clutch drive, and said extension also provided with a conical surface forming an axially fixed element of the friction clutch drive, an axially shiftable ring provided with a conical face forming the co-acting element of the friction clutch drive, said ring being intergeared with the portion of the driven shaft provided with splines thereby to turn therewith, that portion of said ring having said conical face being adapted to extend beyond the plane of the outermost end of said extension and to register with said conical surface on said extension, and said ring being bodily shiftable axially on the shaft to and from its frictional clutching engagement with its fixed companion on said extension, an axially shiftable ring-like member forming the co-acting element of the positive clutch drive, said last named member encircling and operatively connected to turn with the driven shaft and adapted to telescope the extension but not the main gear, and provided with a set of inwardly facing gear-like teeth radially spaced from the driven shaft and adapted to mesh with the set of teeth on the extension, resilient means carried by the shiftable friction clutch element normally projecting externally outwardly therefrom and providing a give-away stop between the teeth of the positive shiftable clutch element and the friction clutch element, manually actuated control means directly engaging said positive slidable clutch element and acting during an initial part of its movement in one direction to move the positive clutch element toward its clutching position to act through the stop and to shift the shiftable friction clutch element into its clutching position until stopped by the fixed friction clutch element, and means operatve on the further advance of the shiftable positive clutch element to move the stop inwardly toward the driven shaft and into an inoperative position within the shiftable friction clutch element and thus permit the positive clutch element to move still further and into its telescoping and positive tooth clutch engagement with its companion.

HOWARD J. MURRAY.